Sept. 30, 1969 MAKOTO FUJITA ET AL 3,469,829
APPARATUS FOR PRODUCING WIRE OF HIGH TENSILE STRENGTH
Filed June 16, 1966 4 Sheets-Sheet 1
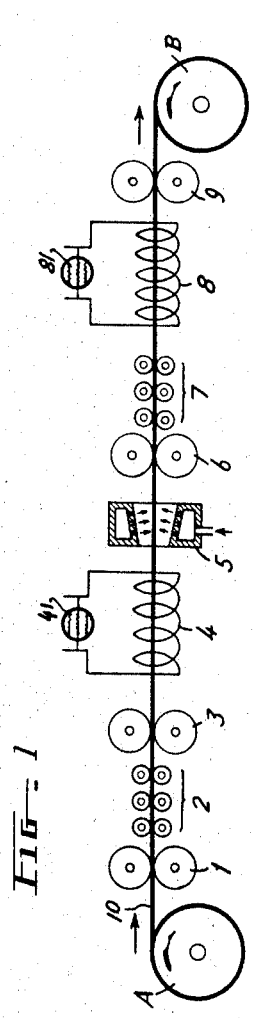
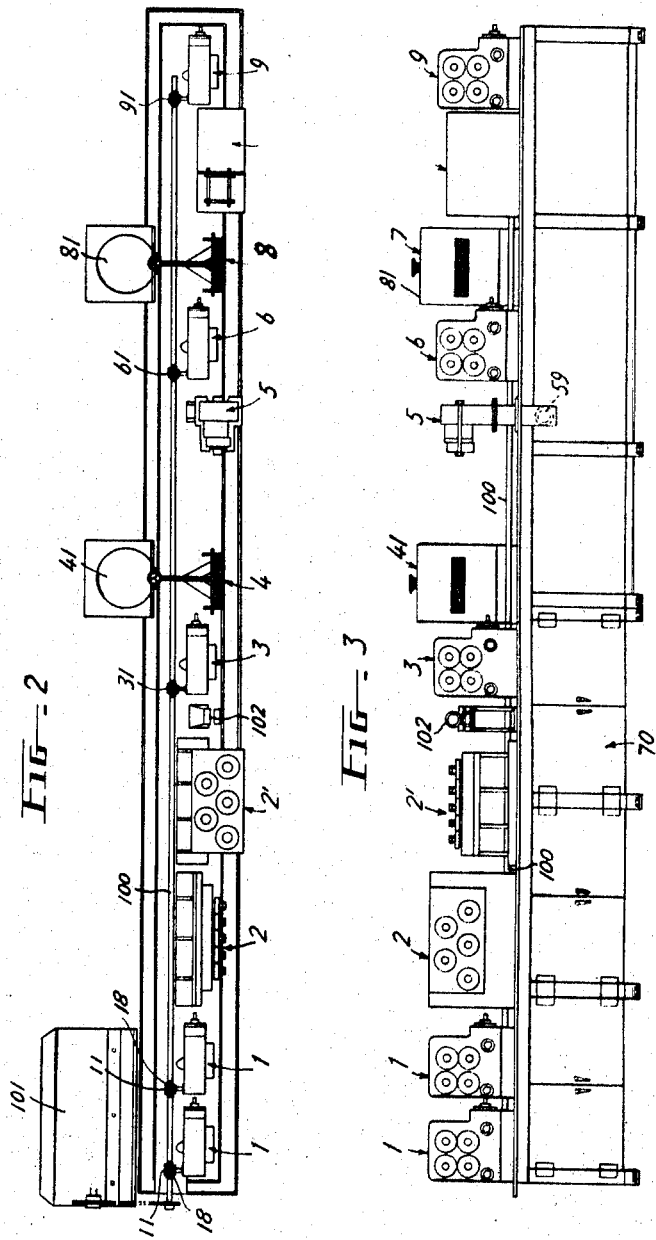
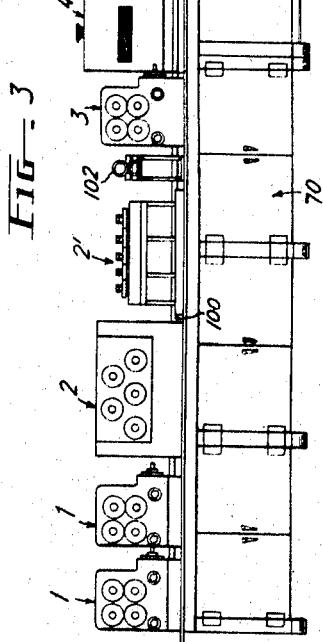
INVENTORS
Makoto Fujita
Koruchiro Katsura
BY
Michael J. Striker

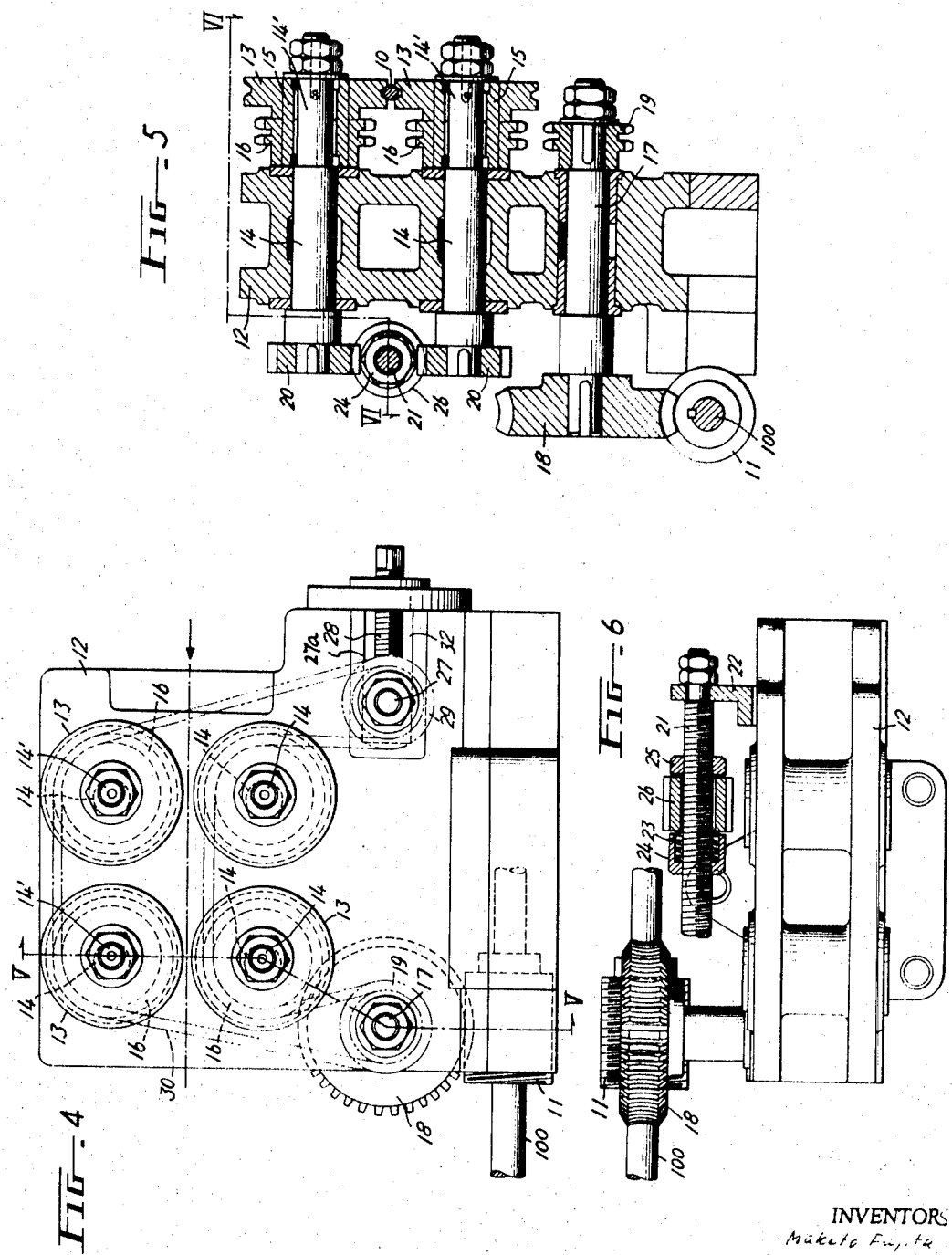

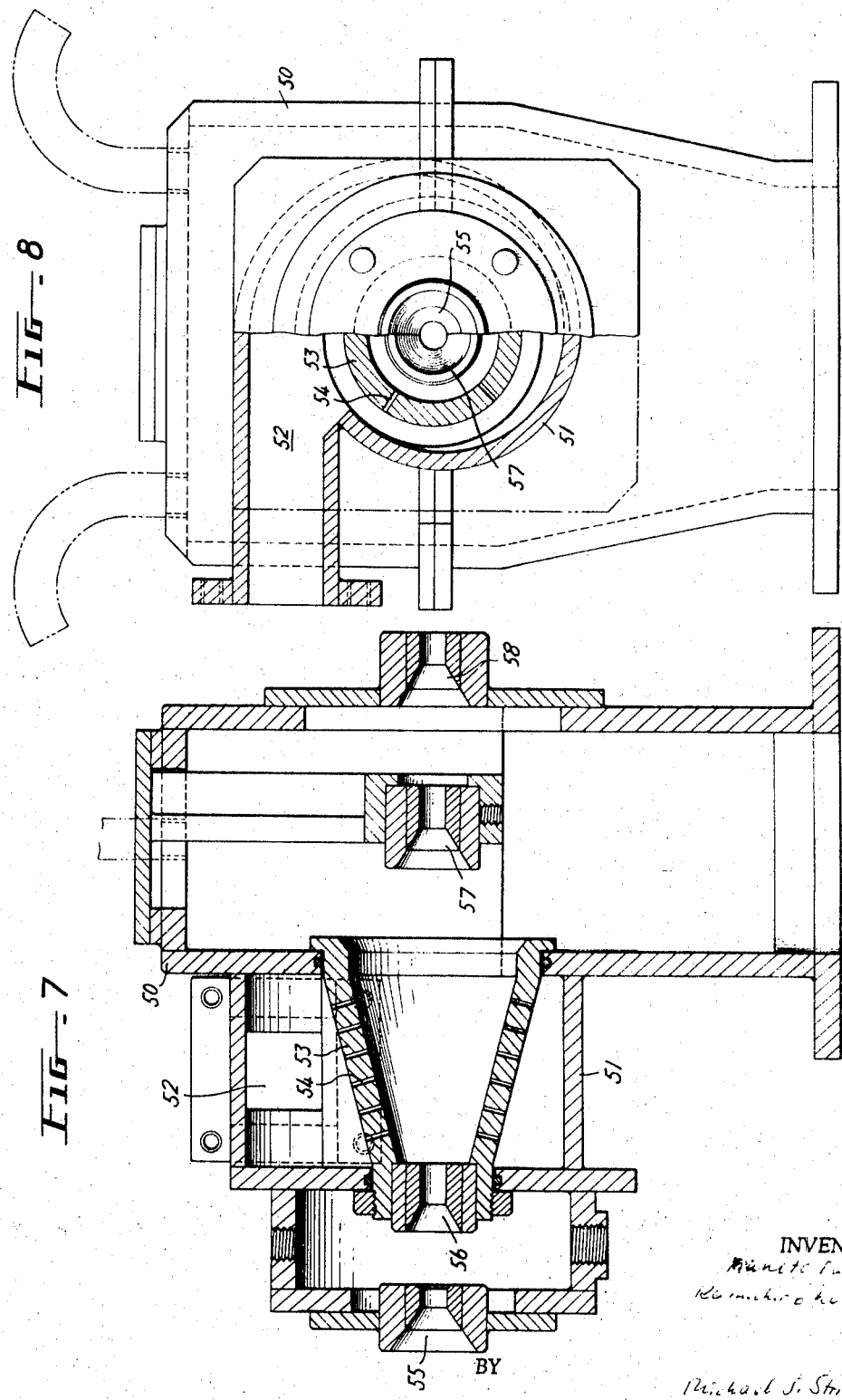

a... o Steel wire by high frequency hardening (in air)
b... o Steel wire by high frequency hardening (spraying of hard water)
c... • Steel wire on the market (spraying of hard water)

United States Patent Office 3,469,829
Patented Sept. 30, 1969

3,469,829
APPARATUS FOR PRODUCING WIRE OF HIGH TENSILE STRENGTH
Makoto Fujita, Tokyo, and Kanichiro Katsura, Yokohama, Japan, assignors to Nippon Kokan Kabushiki Kaisha and Koshuha Netsuren Kabushiki Kaisha, both of Tokyo, Japan
Filed June 16, 1966, Ser. No. 558,073
Int. Cl. C21d 1/66, 1/78, 9/60
U.S. Cl. 266—3                                    7 Claims

ABSTRACT OF THE DISCLOSURE

A continuously transported wire moves through a hardening zone in which it is heated and cooled, and then through a tempering zone in which it is tensioned and heated to a tempering temperature.

---

The present invention relates to an apparatus for producing a steel wire, and more particularly to an apparatus for hardening and tempering a steel wire or the like in a continuous operation which results in a steel wire of high tensile strength.

It is one object of the invention to provide an apparatus for economically manufacturing steel wire having a tensile strength of over 200,000 p.s.i.

Another object of the invention is to produce a steel wire which is particularly suited for use in prestressed concrete.

It is another object of the invention to produce a wire which can be wound into a coil, and unwound again in straight condition.

In accordance with the prior art, piano wires, and other high tensile strength steel wires, have been made of high carbon steel having a carbon content between 0.7 and 0.95%, and the tensile strength and yield point are influenced by drawing the wire whereupon the finished product is obtained by the final stage of the Bruing process.

The conventional manufacturing methods for high tensile strength steel wire are complex, since the desired properties of the wire are obtained by treatments which have to be carried out separately of each other.

It is another object of the invention to overcome this disadvantage of the prior art and to treat a wire having a low carbon content in a continuous operation to produce a steel wire of high tensile strength.

Another object of the invention is to produce a steel wire of high tensile strength by hardening successive portions of a low carbon wire in a continuous operation.

Another object of the invention is to temper the hardened steel wire in the same continuous operation.

Another object of the invention is to harden and temper the wire by the application of a high frequency electric field.

With these objects in view, a steel wire of high tensile strength according to the invention is produced by continuously moving a wire along a path having at least one treating zone; tensioning successive portions of the wire as they move through the treating zone; heating each tensioned portion of the wire in the treating zone to a selected hardening temperature, preferably by the application of a high frequency electric field; and successively cooling each tensioned heated wire portion, preferably by quenching with cold water, so that the entire wire is hardened. Preferably, the hardened portions of the wire are successively tensioned and subjected to another high frequency electric field for heating the hardened wire to a selected tempering temperature so that the wire is tempered, and obtains the desired properties.

It is preferred to straighten the wire between straightening rollers before entering the treating zone in which it is hardened, and also again before entering the treating zone in which it is tempered.

The straightening of the wire has not only the advantage that the same passes easily through the coils which produce the high frequency electric fields for heating the wire to hardening and tempering temperatures, respectively, but also assures that the finished wire will be straight when unwound from a coil into which it is formed after the treatment.

Since the wire is straight when passing through the high frequency coils, the diameter of these coils can be selected to be comparatively small.

An embodiment of the apparatus of the invention comprises a let-off reel and a take-up reel for the wire; transporting roller means which transport the wire between the let-off and take-up reels, and including at least two pairs of clamping rollers transporting the wire at different speeds so that the same is tensioned; and hardening means located between the pairs of clamping rollers, and preferably including a coil for producing a high frequency electric field surrounding the tensioned portion of the wire so that the same is heated to a selected hardening temperature, whereupon a cooling device applies water to the heated wire to harden the same. Preferably, the hardened wire is again tensioned by a pair of clamping rollers rotating at a higher speed, and the hardened tensioned portion passes through another coil producing a high frequency electric field which is selected to heat the wire to a tempering temperature.

As explained above, in the preferred embodiment of the invention, straightening rollers straighten the wire before the same enters the coils of the hardening and tempering means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 1 is a schematic diagram illustrating the successive steps of the continuous operation according to the invention;

FIG. 2 is a plan view of a preferred embodiment of the invention;

FIG. 3 is a side elevation of the embodiment of FIG. 2;

FIG. 4 is a side elevation illustrating on an enlarged scale, a device for tranporting the wire;

FIG. 5 is a sectional view taken on line V—V in FIG. 4;

FIG. 6 is a sectional view taken on line VI–VI, certain parts being omitted for the sake of simplicity;

FIG. 7 is an axial sectional view illustrating a cooling apparatus on an enlarged scale;

FIG. 8 is partially af ront view and partially a cross sectional view of the cooling apparatus illustrated in in FIG. 7;

Figure 9:
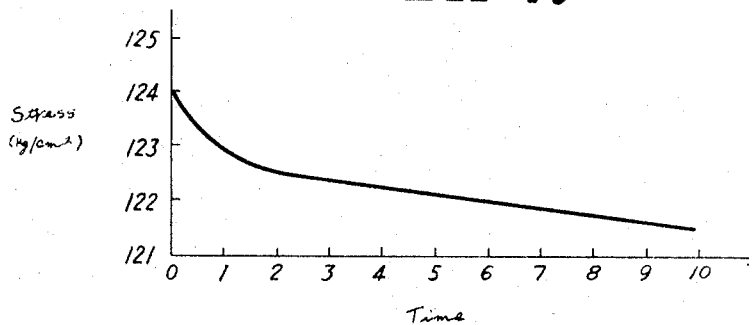
FIG. 9 is a stress diagram illustrating the properties of steel wire according to the prior art.

Referring now to the drawing, and more particularly to FIG. 1, a steel wire 10 is wound off a let-off reel A, and wound up on a take-up reel. Transporting rollers 1 move the wire toward the take-up reel and along a straightening treatment by a set of straightening rollers 2 where-upon it is gripped by a pair of clamping rollers 3 which further transport the wire into a treating zone at whose other end a pair of clamping rollers 6 is located which drive the wire faster than clamping rollers 3 so that the wire is tensioned between the two pairs of clamping rollers 3 and 6. A coil 4 of a high frequency generator surrounds the tensioned wire portion, which is heated to a desired hardening temperature, and then quenched and cooled by the application of cold water by a cooling apparatus 5. In this manner, the successive portions of the wire in the treating zone between rollers 3 and 6 are hardened. The hardened wire is again straightened by a second set of straightening rollers 7, and is driven by another pair of clamping rollers 9 at a higher speed than by clamping roller 6 so that successive wire portions are tensioned in the treating zone between clamping rollers 6 and 9. Another coil 8 of a second high frequency generator surrounds the wire in the treating zone for heating the same to a selected tempering temperature, whereupon the tempered wire in wound up on take-up reel B. The pairs of clamping rollers 3, 6 and 9 constitute first, second, and third transporting means for the wire.

The apparatus schematically illustrated in FIG. 1, is shown in greater detail in FIGS. 2 and 3. A supporting structure 70 carries the apparatus. Transporting devices 1, 3, 6, 9, are mounted on the supporting structure, each transporting device including two pairs of rollers as will be described hereinafter with reference to FIG. 4. The set of straightening rollers includes a first series of rollers 2 whose axes are horizontal, and a second series of rollers 2′ whose axes are vertical so that the wire is straightened in two transverse planes. A speedometer 102 is provided for measuring and indicating the speed of the wire. Coils 4 and 8 received a high frequency current from high frequency generators 41 and 81, respectively. The second set of straightening rollers 7 is omitted in FIGS. 2 and 3. A cooling apparatus 5 discharges water through a tube 59. The transporting roller devices have drive shafts carrying worm gears 18, 31, 61 and 91, respectively, which mesh with corresponding gears on a main shaft 100 which is driven over a chain transmission from a motor 101.

Referring now to FIGS. 4, 5 and 6 which illustrate a transporting roller device, four shafts 14 are mounted in a support 12, and carry symmetrically arranged pairs of rollers 13, and chain wheels 16. Rollers 13 are chain wheels 16 are freely rotatable on shafts 14 since they are mounted on sleeves 15 which surround eccentric portions 14′ of shafts 14.

The other ends of shafts 14 carry gears 20 whose teeth engage the teeth of a tubular rack pinion 26 which is mounted on a threaded spindle 21 for free turning movement between a nut 24 and a spring 23 on one side, and an adjusting nut 25 on the other side. Spindle 21 is mounted on a bracket 22 secured to support 12, as best seen in FIG. 6. When adjustment nut 25 is rotated, the rack pinion 26 is axially displaced and turns gears 20 so that the angular positions of the eccentric shaft portions 14′ are varied, and the spacing between rollers 13 which grip the wire 10 is adjusted in accordance with different diameters of the steel wire 10. Another shaft 17 is also mounted on support 14 and carries a worm wheel 18 meshing with a worm gear 11 on the main shaft 100. Shaft 17 also carries a chain wheel 19. Another shaft 27 is also mounted on the support 12 and carries a chain wheel 29. An endless chain 30 passes about chain wheels 16, 19 and 29 so that when shaft 100 is driven by motor 101, see FIG. 2, all rollers 13 rotate to transport the wire 10 from the let-off reel to the take-up reel. Shaft 27 is mounted on a slide guided in a guideway 27a, and the slide, not shown, has a threaded bore engaged by a threaded spindle 28 so that shaft 27 can be moved by a manual operation within guideway 27a for tensioning chain 30, if required. By adjusting the position of shaft 21 and rack pinion 26, the clamping pressure between cooperating pairs of rollers 13 is adjusted so that the wire is reliably transported and tensioned.

FIGS. 7-8 illustrate the cooling device 5 in greater detail. A casing 50 carries guide means 55, 56, 57 and 58 for the wire a jacket 51 on one side of the casing 50 has frustoconical shape and is perforated by channels 54. A spiral-shaped passage guides water around jacket 53 so that the water enters through the channels 54 into the inner chamber of jacket 53 and cools the wire between guide means 56 and 57. After cooling the wire, the water is discharged through an outlet, not shown in FIGS. 7 and 8.

When a steel wire of high tensile strength having a diameter of 7 mm. is to be produced, a wire drawn from 8 to 7 mm. diameter is wound off the let-off reel A by the transporting rollers 1. The wire is threaded through the straightening roller devices 2, 2′, the transporting roller devices 1, 2, 3, 6 and 9, the coils 4 and 8 of the high frequency generators 41 and 81, and through guide means 55, 56, 57, 58 of the cooling apparatus. The rotary speed of transporting roller 6 is made greater than the rotary speed of transporting roller 3 so that the wire is tensioned in the treating zone between transporting rollers 3 and 6, and passes straight through coil 4 uniformly spaced from the windings of the same and without touching the coil. The tensile force acting on the tensioned wire portion is selected to be less than 5 kg./mm.$^2$ so that no permanent longitudinal distortion is caused while accidental contact between the induction heating coil and the wire is prevented so that a hardened wire of uniform quality and complete straightness is obtained. The wire is heated by induction produced by the high frequency coil 4 to a hardening temperature suitable for the material of which the wire is made, and then cooled in a cooling apparatus 5 so that successive portions of the wire 10 are hardened in the treating zone between rollers 6 and 3. The wire is again tensioned by the faster rotating rollers 9 and preferably straightened by another set of straightening rollers 7 so that successive straight wire portions pass through the induction coil 8. The wire is heated to a selected tempering temperature by coil 8 and then wound up on take-up reel B. Due to the high frequency tempering, the desirable hardness ranges in the inner and outer layers of the wire are obtained, and a wire of high tensile strength is produced. However, depending on the desired properties of the finished product, the tempering treatment may be omitted.

The present invention not only obtains a wire of very high quality having great tensile strength, but achieves this result by a very economical continuous operation.

The treatment according to the invention can be also applied to steel wires between 0.5 mm. and 3.5 mm. diameter. The tensile strength of a steel wire of low or medium carbon content can be increased to over 200,000 p.s.i., and it is not necessary to use steel of high carbon content, or special steel alloys to which chemical elements such as silicon, manganese, chromium, or vanadium have been added in great quantities.

The following examples are given as illustrative only without limiting the invention to the specific details of the examples.

Example I

A wire having a diameter of 7 mm. is used which consists of a steel alloy containing the following additions:

| | Percent |
|---|---|
| C | 0.41 |
| Si | 0.26 |
| Mn | 0.65 |
| P | 0.016 |
| S | 0.012 |
| Cu | 0.06 |
| Ni | 0.013 |
| Cr | 0.032 |

In the above table, the amounts are expressed in percentages, and the balance of the material is steel. The rotary speeds of the rollers 3, 6, 9 are selected in a ratio of 100:102:105, and the speed of the wire in the regions of the rollers 3, 6, 9 is, respectively, 2.4 m./min., 2.45 m./min., and 2.52 m./min. By the application of high frequency electric fields, the wire is heated to a hardening temperature of 930° C., and to a tempering temperature of 370° C.

The finished wire has the properties stated in the first line of the following table, while steel wires according to the prior art have the properties stated in the second line of the following table.

| Yield strength, kg./mm.² | Tensile strength, kg./mm.² | Elongation | Contraction |
| --- | --- | --- | --- |
| 157.3 | 171.0 | 5.78 | 53.6 |
| 155.3 | 170.0 | 5.20 | 35.6 |

Figure 10:
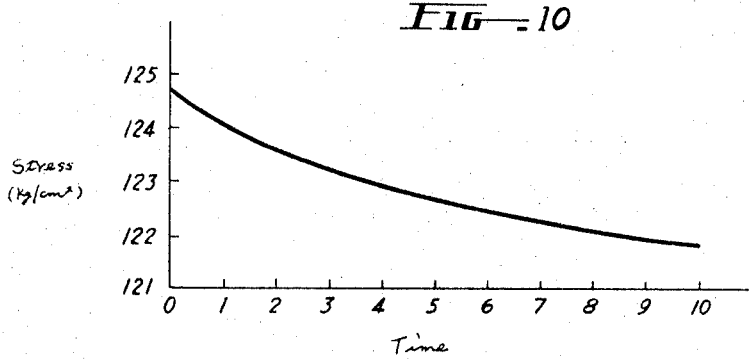
FIG. 10 is a stress diagram illustrating the properties of a steel wire producing in accordance with the invention.

FIG. 9 illustrates the relation of stress to time of a wire according to the invention, while FIG. 10 illustrates the same relation for a wire according to the prior art, the graphs being the results of comparative tests. The wire, according to the prior art, is a steel wire as is generally used for prestressed concrete. There is no substantial difference between the properties of the wires.

Figure 11:
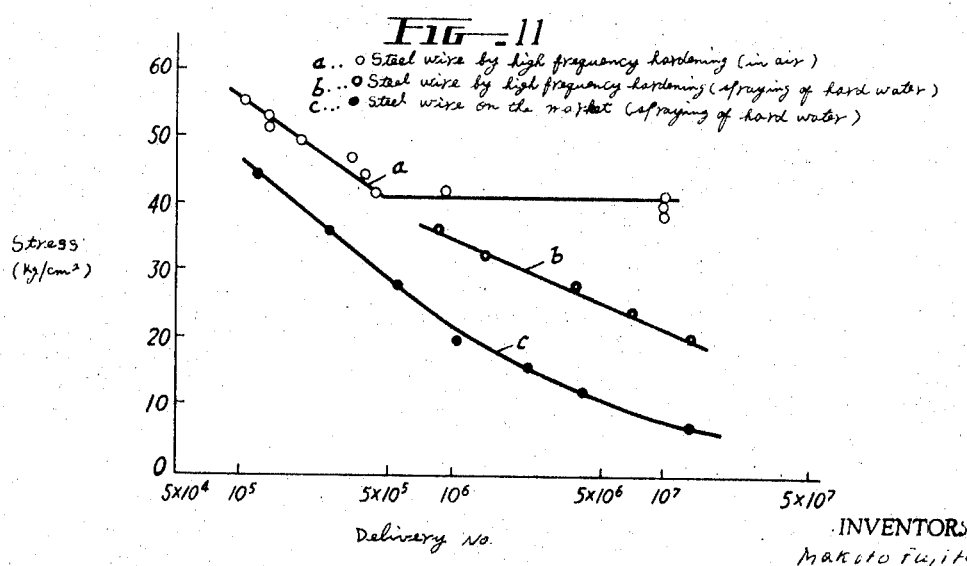
FIG. 11 is a diagram illustrating the results of corrosion fatigue tests for steel wire according to the prior art and according to the present invention.

FIG. 11 indicates the results of corrosion fatigue tests for wires hardened by cooling in air and by cooling with water, respectively. The wire, according to the invention, produces better results, as indicated by the graph b as compared with standard steel wire as indicated by graph c. No irregularity was noted when the wire was subjected to stress corrosion and low temperature fragility test.

Example II

A wire having a diameter of 7 mm. is used which is made of a steel alloy containing 0.18% carbon, 0.55% manganese, 0.033% phosphorus, 0.018% sulfur, and traces of silicon and driven by rollers 3, 6, 9 as in Example I, but is heated by a high frequency field to a hardening temperature of 1.100° C. without tempering.

The following table states in the first line data concerning the untreated wire, and in the second line the corresponding data for the finished wire after hardening and cooling.

| Yield strength, kg./mm.² | Yield point, kg./mm.² | Elongation | Contraction |
| --- | --- | --- | --- |
| 43.4 | 26.2 | 22.5 | 67.3 |
| 136.7 | 118.4 | 3.2 | 32.7 |

The improvement of the mechanical properties of the wire is substantial.

Example III

A steel wire having a diameter of 9 mm. and made of a steel alloy containing 0.18% carbon, 0.24% silicon, 0.47% manganese, 0.013% phosphorus, 0.014% sulfur, 0.07% copper, 0.038% nickel, and 0.04% chromium is heated by a high frequency electric field to a hardening temperature of 1.150° C., but not tempered. The finished steel wire has the following properties:

Yield strength (kg./mm.²) _____ 148.1
Yield point (kg./mm.²) _____ 122.4
Elongation _____ 6.9
Contraction _____ 38.8

Example IV

A wire having a diameter of 8 mm. and consisting of a steel alloy containing 0.12% carbon, 0.08% silicon, 0.37% manganese, 0.007% phosphorus and 0.029% sulfur is heated by a high frequency electric field to a hardening temperature of 1.100° C., and acquires the following mechanical properties:

Yield strength kg./mm.²) _____ 120
Elongation _____ 3
Contraction _____ 28

Example V

A wire having a diameter of 5.6 cc. consisting of a steel alloy containing 0.23% carbon, 0.01% silicon, 0.40% manganese, 0.020% phosphorus, and 0.025% sulfur is heated in a high frequency electric field to a hardening temperature of 1.050° C., and acquires the following mechanical properties:

Yield strength (kg./mm.²) _____ 153
Elongation _____ 3.1
Contraction _____ 32

From the above examples, it is apparent that the present invention produces a steel wire which has excellent static and dynamic mechanical properties which are superior to the properties of standard piano wire, or other hard steel wires. A wire of high tensile strength is obtained by a continuous operation starting with the wire material ending with the finished product. Since hardening and tempering of the wire are carried out at an adequate tension, it is possible to use compact apparatus of small size, while accidents and malfunctions during the treatment are avoided, and a finished product of uniform quality is obtained as a wire in straight condition.

It will be understood that each of the elements described above, or two or more together, may also find a useful application in other types of apparatus for producing steel wires of high tensile strength differing from the types described above.

While the invention has been illustrated and described as embodied in a method and apparatus for straightening, hardening, and tempering a low carbon steel wire so that a steel wire of high tensile strength is obtained, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for producing a wire of high tensile strength, comprising, in combination, let-off reel means and take-up reel means for a wire; transporting roller means for transporting the wire along a path between said let-off and take-up reel means, and including at least two pairs of rollers spaced along said path for transporting said wire at different speeds so that the same is tensioned between said pairs of rollers; hardening means located between said pairs of rollers and including coil means for applying a high frequency electric field to the tensioned portion of said wire for heating the same to a selected hardening temperature, and means for applying a cooling medium to said heated wire so that the same is hardened; another pair of rollers located in the region of said take-up reel means and rotating at a higher speed than said two pairs of rollers so that said hardened wire is tensioned by said other pair of rollers; and tempering means including a coil for applying to said hardened and tensioned wire another high frequency electric field for heating said hardened wire to a tempering temperature whereby said wire is tempered before wound up on said take-up reel means.

2. An apparatus according to claim 1 and including a set of straightening rollers disposed between said pairs of rollers and said let-off reel means for straightening said wire before the same is heated.

3. An apparatus according to claim 1 wherein said two pairs of rollers include first and second rollers located on opposite sides of said wire; and including two eccentric shafts supporting said first and second rollers, respectively, for rotation; and means for adjusting the angular position of said eccentric shafts and thereby the distance between said first and second rollers and the clamping pressure exerted on said wire by said first and second rollers upon a change in the wire diameter.

4. Apparatus for producing a wire of high tensile strength, comprising, in combination, first, second, and third transporting means for transporting a wire along a path, and for tensioning said wire by operation of each succeeding transporting means at a higher speed than the preceding one; hardening means located between said first and second transporting means and including first heating means for heating said first tensioned portion of said wire to a selected hardening temperature, and quenching means located between said hardening means and said second transporting means for applying a cooling medium to the heated first wire portion so that the same is hardened; and tempering means located between said second and third transporting means and including second heating means for heating said second tensioned and hardened portion of said wire to a selected tempering temperature whereby the wire is tempered.

5. An apparatus according to claim 1 and including a first set of pairs of straightening rollers disposed along said path between said let-off reel means and said two pairs of rollers, and engaging opposite sides of said wire for straightening said wire before the same is hardened by said hardening means; and a second set of pairs of straightening rollers disposed along said path between said two pairs of rollers and said tempering means, and engaging opposite sides of said wire for straightening the hardened wire portions before the same are heated by said tempering means.

6. Apparatus for producing a wire of high tensile strength, comprising, in combination, let-off reel means and take-up reel means for a wire; transporting roller means for transporting the wire along a path between said let-off and take-up reel means, and including at least two pairs of rollers spaced along said path for transporting said wire at different speeds so that the same is tensioned between said pairs of rollers; and hardening means located between said pairs of rollers and including heating means for heating the tensioned portion of said wire to a selected hardening temperature, a jacket surrounding said heated wire and having perforations, and a spiral-shaped guide tube around said jacket for supplying cold water to the outside of said jacket so that water flows inwardly through the perforations of said jacket onto said heated wire and cools and hardens the same.

7. An apparatus as claimed in claim 6 wherein said heating means includes coil means for applying a high frequency electric field to the tensioned portion of said wire for heating the same to said selected hardening temperature.

References Cited

UNITED STATES PATENTS

| | | | |
|---|---|---|---|
| Re. 3,290 | 4/1858 | Bailey | 72—197 |
| 1,386,645 | 8/1921 | Moore | 148—156 X |
| 1,732,244 | 10/1929 | Salzman | 266—3 X |
| 2,783,788 | 3/1957 | Ungerer | 148—156 X |
| 2,880,739 | 4/1959 | Popp | 266—3 X |
| 2,932,502 | 4/1960 | Rudd et al. | 266—3 |
| 3,154,440 | 10/1964 | Grimes et al. | 266—3 X |
| 3,368,381 | 2/1968 | Fröhling | 72—248 X |

J. SPENCER OVERHOLSER, Primary Examiner

R. SPENCER ANNEAR, Assistant Examiner

U.S. Cl. X.R.

134—199; 140—2; 148—131, 156; 266—4, 6